US010726559B2

(12) United States Patent
Bergstrom et al.

(10) Patent No.: US 10,726,559 B2
(45) Date of Patent: Jul. 28, 2020

(54) VISIBLE LIGHT IMAGE WITH EDGE MARKING FOR ENHANCING IR IMAGERY

(71) Applicant: Fluke Corporation, Everett, WA (US)

(72) Inventors: Peter A. Bergstrom, St. Paul, MN (US); Kirk R. Johnson, Rogers, MN (US); James T. Pickett, Santa Cruz, CA (US)

(73) Assignee: Fluke Corporation, Everett, WA (US)

( * ) Notice: Subject to any disclaimer, the term of this patent is extended or adjusted under 35 U.S.C. 154(b) by 0 days.

(21) Appl. No.: 16/456,755

(22) Filed: Jun. 28, 2019

(65) Prior Publication Data

US 2019/0325582 A1 Oct. 24, 2019

Related U.S. Application Data

(63) Continuation of application No. 15/976,299, filed on May 10, 2018, now Pat. No. 10,366,496, which is a
(Continued)

(51) Int. Cl.
*G06T 7/13* (2017.01)
*H04N 5/232* (2006.01)
(Continued)

(52) U.S. Cl.
CPC ............. *G06T 7/13* (2017.01); *G06K 9/6289* (2013.01); *G06T 5/50* (2013.01); *H04N 5/04* (2013.01);
(Continued)

(58) Field of Classification Search
CPC ............. H04N 5/33; H04N 5/272; H04N 7/18
(Continued)

(56) References Cited

U.S. PATENT DOCUMENTS 4,782,399 A 11/1988 Sato
4,949,166 A 8/1990 Isnardi
(Continued)

FOREIGN PATENT DOCUMENTS

CN 1545064 A 11/2004
CN 101067710 A 11/2007
(Continued)

OTHER PUBLICATIONS

Angel et al., Review of Fusion Systems and Contributing Technologies for SIHS, Humansystems, Inc., Defense Research and Development Canada—Toronto, Mar. 31, 2007, 112 pgs.
(Continued)

*Primary Examiner* — Thai Q Tran
*Assistant Examiner* — Syed Y Hasan
(74) *Attorney, Agent, or Firm* — Fredrikson & Byron, P.A.

(57) ABSTRACT

The invention relates generally to edge detection and presentation in thermal images. Infrared and visible light images comprising at least partially overlapping target scenes are analyzed. An edge detection process is performed on the visible light image to determine which pixels represent edges in the target scene. A display image is generated in which some pixels include infrared image data and in which pixels corresponding to edges in the visible light image include a predetermined color and do not include corresponding infrared image data to emphasize edges. Edge pixels in the display image can include exclusively the predetermined color, or in some examples, a blend of a predetermined color and visible light image data. Methods can include replacing one or the other of visible light edge pixels or corresponding infrared pixels with the predetermined color before combining the visible light and infrared image data to create a display image.

21 Claims, 11 Drawing Sheets

Related U.S. Application Data continuation of application No. 14/222,153, filed on Mar. 21, 2014, now Pat. No. 9,990,730.

(51) Int. Cl.
| | |
|---|---|
| *H04N 5/04* | (2006.01) |
| *H04N 5/33* | (2006.01) |
| *G06T 5/50* | (2006.01) |
| *H04N 5/83* | (2006.01) |
| *G06K 9/62* | (2006.01) |
| *G06K 9/46* | (2006.01) |
| *G09G 3/20* | (2006.01) |

(52) U.S. Cl.
CPC ..... *H04N 5/23229* (2013.01); *H04N 5/23293* (2013.01); *H04N 5/332* (2013.01); *G06K 9/4604* (2013.01); *G06T 2207/10024* (2013.01); *G06T 2207/10048* (2013.01); *G06T 2207/20221* (2013.01); *G09G 3/20* (2013.01); *H04N 5/83* (2013.01)

(58) Field of Classification Search
USPC .................................................. 348/164, 143
See application file for complete search history.

(56) References Cited

U.S. PATENT DOCUMENTS

| | | |
|---|---|---|
| 4,967,276 A | 10/1990 | Murakami et al. |
| 5,133,605 A | 7/1992 | Nakamura |
| 5,325,449 A | 6/1994 | Burt et al. |
| 5,488,674 A | 1/1996 | Burt et al. |
| 5,555,324 A | 9/1996 | Waxman et al. |
| 5,898,331 A | 4/1999 | Fujita |
| 5,910,816 A | 6/1999 | Fontenot et al. |
| 5,949,914 A | 9/1999 | Yuen |
| 5,969,754 A | 10/1999 | Zeman |
| 5,974,165 A | 10/1999 | Giger et al. |
| 6,898,331 B2 | 5/2005 | Tiana |
| 6,920,236 B2 | 7/2005 | Prokoski |
| 7,199,366 B2 | 4/2007 | Hahn et al. |
| 7,298,404 B2 | 11/2007 | Shimazaki |
| 7,324,072 B1 | 1/2008 | Canova, Jr. et al. |
| 7,491,935 B2 | 2/2009 | Burne et al. |
| 7,538,326 B2 | 5/2009 | Johnson et al. |
| 7,570,286 B2 | 8/2009 | Koike et al. |
| 7,589,771 B2 | 9/2009 | Hosaka et al. |
| 7,593,573 B2 | 9/2009 | Hahn et al. |
| 7,613,360 B2 | 11/2009 | Ma et al. |
| 7,620,265 B1 | 11/2009 | Wolff et al. |
| 7,667,762 B2 | 2/2010 | Jenkins |
| 7,693,331 B2 | 4/2010 | Porikli et al. |
| 7,705,855 B2 | 4/2010 | Brown |
| 7,876,973 B2 | 1/2011 | Fairbanks et al. |
| 7,924,312 B2 | 4/2011 | Packard |
| 7,961,229 B2 | 6/2011 | Soga |
| 7,994,480 B2 | 8/2011 | Johnson et al. |
| 8,254,718 B2 | 8/2012 | Bennett et al. |
| 8,374,438 B1 | 2/2013 | Wagner |
| 8,457,437 B2 | 6/2013 | Peterson et al. |
| 8,503,778 B2 | 8/2013 | Sim et al. |
| 8,520,970 B2 | 8/2013 | Strandemar |
| 8,565,547 B2 | 10/2013 | Strandemar |
| 8,614,746 B2 | 12/2013 | Choe et al. |
| 8,630,465 B2 | 1/2014 | Wieringa et al. |
| 8,723,958 B2 | 5/2014 | Kamon et al. |
| 8,749,635 B2 | 6/2014 | Hgasten et al. |
| 8,781,246 B2 | 7/2014 | Lewis et al. |
| 9,088,737 B2 | 7/2015 | Hahn et al. |
| 2002/0015536 A1 | 2/2002 | Warren et al. |
| 2005/0270425 A1 | 12/2005 | Min |
| 2006/0268110 A1 | 11/2006 | Koike et al. |
| 2007/0183657 A1 | 8/2007 | Kidono et al. |
| 2007/0201738 A1 | 8/2007 | Toda et al. |
| 2007/0291170 A1 | 12/2007 | Han et al. |
| 2008/0024608 A1 | 1/2008 | Hahn et al. |
| 2008/0111894 A1 | 5/2008 | Tanimoto |
| 2008/0284791 A1 | 11/2008 | Bressan et al. |
| 2009/0302219 A1 | 12/2009 | Johnson et al. |
| 2010/0045809 A1 | 2/2010 | Packard |
| 2010/0073499 A1 | 3/2010 | Gere |
| 2010/0085433 A1 | 4/2010 | Choe et al. |
| 2010/0290703 A1 | 11/2010 | Sim et al. |
| 2011/0001809 A1 | 1/2011 | McManus et al. |
| 2011/0122251 A1 | 5/2011 | Schmidt |
| 2011/0122252 A1 | 5/2011 | Choi et al. |
| 2012/0086810 A1* | 4/2012 | Messerschmid ....... A61B 5/015 348/164 |
| 2012/0128243 A1 | 5/2012 | Singh et al. |
| 2012/0154596 A1 | 6/2012 | Wajs |
| 2012/0262584 A1 | 10/2012 | Strandemar |
| 2013/0155249 A1 | 6/2013 | Neeley et al. |
| 2013/0342691 A1* | 12/2013 | Lewis .................... H04N 5/332 348/143 |
| 2014/0015982 A9 | 1/2014 | Strandemar |
| 2014/0104415 A1 | 4/2014 | Fox et al. |
| 2014/0160298 A1 | 6/2014 | Johnson |
| 2014/0240512 A1 | 8/2014 | Hgasten et al. |
| 2014/0267353 A1 | 9/2014 | Schmidt et al. |
| 2014/0340515 A1 | 11/2014 | Tanaka et al. |
| 2014/0355902 A1 | 12/2014 | Olsson |
| 2015/0109454 A1 | 4/2015 | Strandemar et al. |
| 2015/0269742 A1 | 9/2015 | Bergstrom et al. |
| 2015/0334315 A1 | 11/2015 | Teich et al. |
| 2015/0358560 A1 | 12/2015 | Boulanger et al. |

FOREIGN PATENT DOCUMENTS

| | | |
|---|---|---|
| CN | 101546428 A | 9/2009 |
| CN | 101714251 A | 5/2010 |
| CN | 103063314 A | 4/2013 |
| CN | 103270746 A | 8/2013 |
| CN | 105009568 A | 10/2015 |
| DE | 10218175 B4 | 10/2011 |
| EP | 0892286 A1 | 1/1999 |
| EP | 1975673 A2 | 10/2008 |
| EP | 2194503 A1 | 6/2010 |
| JP | S6211384 A | 1/1987 |
| JP | H03125573 A | 5/1991 |
| JP | 2007143624 A | 6/2007 |
| JP | 2010103740 A | 5/2010 |
| JP | 2012120047 A | 6/2012 |
| JP | 2013039223 A | 2/2013 |
| KR | 20030085742 A | 11/2003 |
| WO | 2006017233 A1 | 2/2006 |
| WO | 2009002902 A2 | 12/2008 |
| WO | 2014100786 A1 | 6/2014 |

OTHER PUBLICATIONS

Bebis et al., Face Recognition by Fusing Thermal Infrared and Visible Imagery, Image and Vision Computing, vol. 24, No. 7, Jul. 2006, pp. 727-742.

Bennett et al., "Multispectral Bilateral Video Fusion," IEEE Transactions on Image Processing, vol. 16, No. 5., May 2007, 10 pgs.

Davis et al., "Background-Subtraction in Thermal Imagery Using Contour Saliency," International Journal of Computer Vision 71(2), 2007, 21 pgs.

Extended Search Report for European Application No. 15160011.1, 10 pgs, dated Jun. 10, 2015.

Gangkofner et al., "Optimizing the High-Pass Filter Addition Technique for Image Fusion," Photogrammetric Engineering & Remote Sensing, Sep. 2008, 12 pgs.

Guoqiang et al., "Real-Time Color Image Fusion and its Key Technologies," Department of Optical Engineering, School of Information Science and Technology, Beijing Institute of Technology, retrieved Jun. 17, 2015 from the Internet: < http://www.coema.org.cn/e_real.htm>, 4 pgs.

Heather et al., "Multimodal Image Registration with Applications to Image Fusion," 2005 7th International Conference on Information Fusion (Fusion), 8 pgs.

(56) References Cited

OTHER PUBLICATIONS

Ibrahim et al., "Visible and IR Data Fusion Technique Using the Contourlet Transform," International Conference on Computational Science and Engineering, Aug. 29-31, 2009, pp. 42-47.

Jang et al., "Pseudo-color Image Fusion Based on Intensity-hue-saturation Color Space," Proceedings of IEEE International Conference on Multisensor Fusion and Integration for Intelligent Systems, Aug. 20-22, 2008, pp. 366-371.

Jiang et al., "Perceptual-based Fusion of IR and Visual Images for Human Detection," Proceedings of International Symposium on Intelligent Multimedia, Video and Speech Processing, Oct. 20-22, 2004, pp. 514-517.

Lallier et al, "A Real Time Pixel-Level Based Image Fusion via Adaptive Weight Averaging," IEEE Conference paper, Jul. 20, 2000, 11 pgs.

Li et al., "Merging Infrared and Color Visible Images with a Contrast Enhanced Fusion Method," Multisensor, Multisource Information Fusion: Architectures, Algorithms, and Applications, Proceedings of SPIE, vol. 6571, Apr. 9, 2007, 12 pgs.

Sharma et al., "A Feature-Selection Approach to Fusing Electro-Optical and IR Imager," SPIE Newsroom, 3 pgs, 2009.

Sharma et al., "Feature-level Fusion for Object Segmentation using Mutual Information," Appears in Augmented Vision Perception in Infrared, Springer, Dec. 2008, 26 pgs.

Therrien, An Adaptive Technique for the Enhanced Fusion of Low-Light Visible with Uncooled Thermal Infrared Imagery, Naval Postgraduate School, 4 pgs, 1997.

Toet et al., "Perceptual Evaluation of Different Image Fusion Schemes," Elsevier, 2003, 13 pgs.

Toet, "Hierarchical Image Fusion," Machine Vision and Applications, 1990, 11 pgs.

Toet et al., "Merging Thermal and Visual Images by a Contrast Pyramid," Optical Engineering, 1989, 4 pages.

Vrabel, "Multispectral Imagery Band Sharpening Study," PE&RS, Sep. 1996, 9 pgs.

Wang et al., "A Comparative Analysis of Image Fusion Methods," IEEE Transactions on Geoscience and Remote Sensing, vol. 43, No. 6, Jun. 2005, pp. 1391-1402.

Wolff et al., "Advances in Low-Power Visible/Thermal IR Video Image Fusion Hardware," Proceedings of SPIE on Thermosense XXVII, vol. 5782, Mar. 28, 2005, pp. 54-58.

Wolff et al., "Versatile Low-Power Multi-Spectral Video Fusion Hardware," Proceedings of SPIE on Infrared Technology and Applications XXXIII, vol. 6206, 2006, 6 pgs.

\* cited by examiner

VISIBLE LIGHT IMAGE WITH EDGE MARKING FOR ENHANCING IR IMAGERY

CROSS REFERENCE TO RELATED APPLICATION

This application is a continuation application of U.S. patent application Ser. No. 15/976,299, filed May 10, 2018 and titled "VISIBLE LIGHT IMAGE WITH EDGE MARKING FOR ENHANCING IR IMAGERY" which is a continuation application of U.S. patent application Ser. No. 14/222,153, filed Mar. 21, 2014 and titled "VISIBLE LIGHT IMAGE WITH EDGE MARKING FOR ENHANCING IR IMAGERY." The entire content of these applications are incorporated herein by reference.

BACKGROUND

Thermal imaging cameras are used in a variety of situations. For example, thermal imaging cameras are often used during maintenance inspections to thermally inspect equipment. Example equipment may include rotating machinery, electrical panels, or rows of circuit breakers, among other types of equipment. Thermal inspections can detect equipment hot spots such as overheating machinery or electrical components, helping to ensure timely repair or replacement of the overheating equipment before a more significant problem develops.

Depending on the configuration of the camera, the thermal imaging camera may also generate a visible light image of the same object. The camera may display the infrared image and the visible light image in a coordinated manner, for example, to help an operator interpret the thermal image generated by the thermal imaging camera. Unlike visible light images which generally provide good contrast between different objects, it is often difficult to recognize and distinguish different features in a thermal image as compared to the real-world scene. For this reason, an operator may rely on a visible light image to help interpret and focus the thermal image. For example, overlapping and/or combining the visible light image and the thermal image can provide some guidance for the operator. However, in some situations, it can still be difficult to distinguish edges and boundaries of objects in the thermal image.

SUMMARY

Aspects of the present invention are directed towards edge detection and display in thermal images. Embodiments of the invention can include a non-transitory computer-readable medium with instructions for causing a processor to perform a method for generating a display image with emphasized edges. For example, a processor can receive visible light (VL) image data comprising a plurality of VL pixels and infrared (IR) image data comprising a plurality of IR pixels. One or more IR pixels can comprise one or more corresponding VL pixels.

The processor can analyze VL image data of the target scene and detect edges within the VL image data. Edge detection can be performed in any of a variety of ways. The processor can determine which VL pixels correspond to detected edges and consider such pixels to be VL edge pixels. The processor can further generate a display image having a plurality of display pixels corresponding to one or more VL pixels. Display pixels can generally comprise VL, IR, or a combination of VL and IR pixels.

Display pixels can be generated such that some of the display pixels include IR image data associated with corresponding IR pixels. Such pixels can be presented as a blend of VL and IR pixels, for example, or include exclusively IR image data. Display pixels corresponding to VL edge pixels can be include a predetermined color and not include IR image data associated with corresponding IR pixels in order to emphasize the location of edges in the display image data. Assigning the display pixel a predetermined color can be performed in a plurality of ways. For example, generating display image data can include replacing all VL edge pixels with pixels of the predetermined color, and displaying such pixels comprising the predetermined color as the corresponding display pixels. In other embodiments, IR pixels corresponding to VL edge pixels can be replaced with the predetermined color to create modified IR image data. Subsequent blending of IR image data and VL image data can result in display pixels corresponding to VL edge pixels comprising the predetermined color blended with VL image data.

In some embodiments, display image data can be generated substantially in real time and presented on a display. Accordingly, embodiments of the present invention can include a display system capable of any or all of receiving VL and corresponding IR images, detecting edge pixels in the VL image data and generating and displaying display image in which edges are emphasized, providing added context to an IR image. Such display systems can include a thermal imaging camera comprising IR and VL camera modules configured to detect IR and VL images of a target scene, respectively.

Various aspects of the present invention can be modified by a user. For example, in some embodiments, a user can manipulate the edge detection process so as to detect more or fewer edges. Such manipulation can include adjusting an edge detection sensitivity threshold used in the edge detection process. A user can adjust an amount of blending between VL and IR image data in creating one or more display pixels. In some embodiments, the user can select the predetermined color for customized emphasis of edges in an IR image. Accordingly, aspects of the invention can include receiving one or more inputs from the user interface in order to perform edge detection and/or display in a user-defined way.

DETAILED DESCRIPTION

The following detailed description is exemplary in nature and is not intended to limit the scope, applicability, or configuration of the invention in any way. Rather, the following description provides some practical illustrations for implementing various embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

A thermal imaging camera may be used to detect heat patterns across a scene, including an object or objects, under observation. The thermal imaging camera may detect infrared radiation given off by the scene and convert the infrared radiation into an infrared image indicative of the heat patterns. In some embodiments, the thermal imaging camera may also capture visible light from the scene and convert the visible light into a visible light image. Depending on the configuration of the thermal imaging camera, the camera may include infrared optics to focus the infrared radiation on an infrared sensor and visible light optics to focus the visible light on a visible light sensor.

Various embodiments provide methods and systems for producing thermal images with reduced noise using averaging techniques. To further improve image quality and eliminate problems that may arise from averaging (e.g. blurring, ghosting, etc.), an image alignment process is performed on the thermal images prior to averaging.

Figure 1:
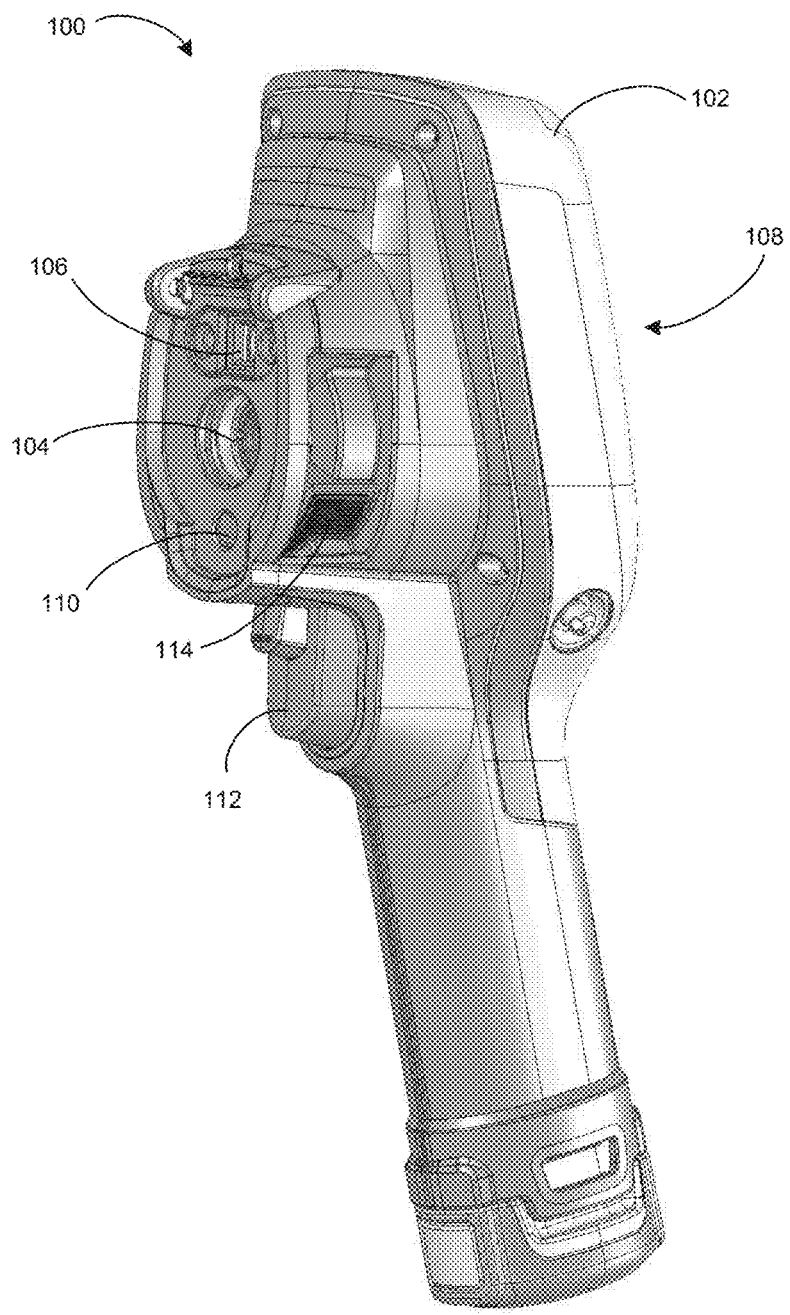
FIG. 1 is a perspective front view of an example thermal imaging camera.
Figure 2:
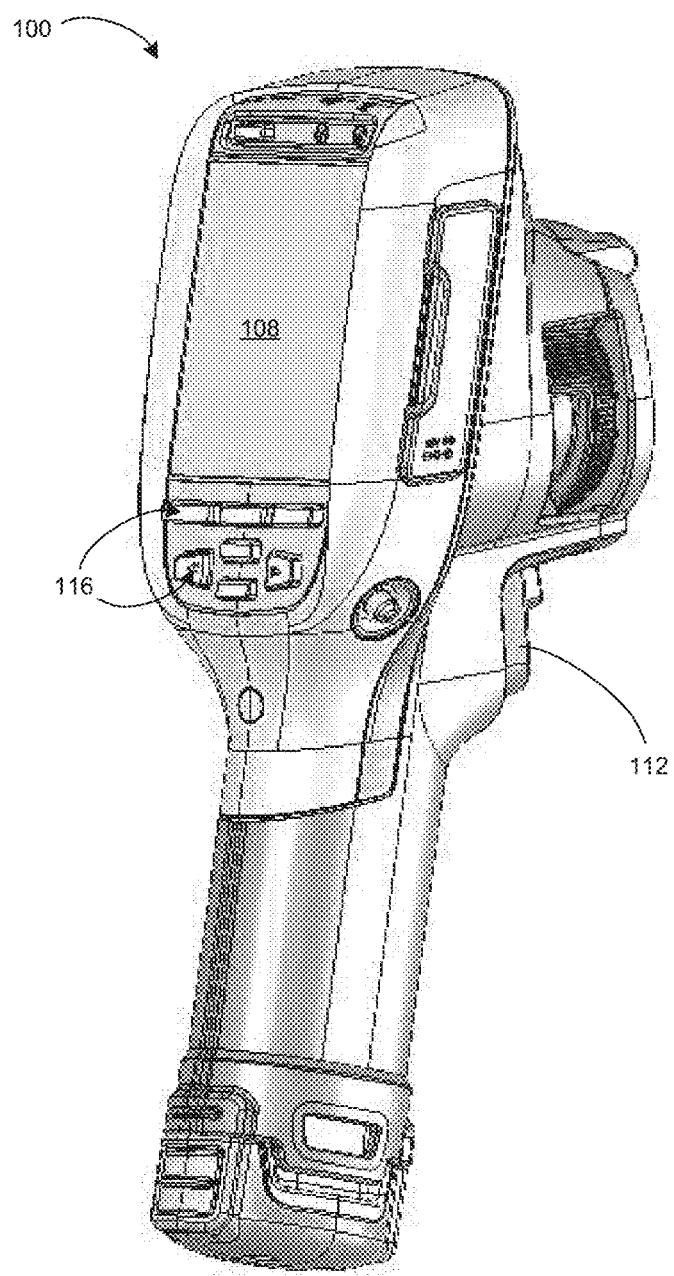
FIG. 2 is a perspective back view of the example thermal imaging camera of FIG. 1.

FIGS. 1 and 2 show front and back perspective views, respectively of an example thermal imaging camera 100, which includes a housing 102, an infrared lens assembly 104, a visible light lens assembly 106, a display 108, a laser 110, and a trigger control 112. Housing 102 houses the various components of thermal imaging camera 100. The bottom portion of thermal imaging camera 100 includes a carrying handle for holding and operating the camera via one hand. Infrared lens assembly 104 receives infrared radiation from a scene and focuses the radiation on an infrared sensor for generating an infrared image of a scene. Visible light lens assembly 106 receives visible light from a scene and focuses the visible light on a visible light sensor for generating a visible light image of the same scene. Thermal imaging camera 100 captures the visible light image and/or the infrared image in response to depressing trigger control 112. In addition, thermal imaging camera 100 controls display 108 to display the infrared image and the visible light image generated by the camera, e.g., to help an operator thermally inspect a scene. Thermal imaging camera 100 may also include a focus mechanism coupled to infrared lens assembly 104 that is configured to move at least one lens of the infrared lens assembly so as to adjust the focus of an infrared image generated by the thermal imaging camera.

In operation, thermal imaging camera 100 detects heat patterns in a scene by receiving energy emitted in the infrared-wavelength spectrum from the scene and processing the infrared energy to generate a thermal image. Thermal imaging camera 100 may also generate a visible light image of the same scene by receiving energy in the visible light-wavelength spectrum and processing the visible light energy to generate a visible light image. As described in greater detail below, thermal imaging camera 100 may include an infrared camera module that is configured to capture an infrared image of the scene and a visible light camera module that is configured to capture a visible light image of the same scene. The infrared camera module may receive infrared radiation projected through infrared lens assembly 104 and generate therefrom infrared image data. The visible light camera module may receive light projected through visible light lens assembly 106 and generate therefrom visible light data.

In some examples, thermal imaging camera 100 collects or captures the infrared energy and visible light energy substantially simultaneously (e.g., at the same time) so that the visible light image and the infrared image generated by the camera are of the same scene at substantially the same time. In these examples, the infrared image generated by thermal imaging camera 100 is indicative of localized temperatures within the scene at a particular period of time while the visible light image generated by the camera is indicative of the same scene at the same period of time. In other examples, thermal imaging camera may capture infrared energy and visible light energy from a scene at different periods of time.

Visible light lens assembly 106 includes at least one lens that focuses visible light energy on a visible light sensor for generating a visible light image. Visible light lens assembly 106 defines a visible light optical axis which passes through the center of curvature of the at least one lens of the assembly. Visible light energy projects through a front of the lens and focuses on an opposite side of the lens. Visible light lens assembly 106 can include a single lens or a plurality of lenses (e.g., two, three, or more lenses) arranged in series. In addition, visible light lens assembly 106 can have a fixed focus or can include a focus adjustment mechanism for changing the focus of the visible light optics. In examples in which visible light lens assembly 106 includes a focus adjustment mechanism, the focus adjustment mechanism may be a manual adjustment mechanism or an automatic adjustment mechanism.

Infrared lens assembly 104 also includes at least one lens that focuses infrared energy on an infrared sensor for generating a thermal image. Infrared lens assembly 104 defines an infrared optical axis which passes through the center of curvature of lens of the assembly. During operation, infrared energy is directed through the front of the lens and focused on an opposite side of the lens. Infrared lens assembly 104 can include a single lens or a plurality of lenses (e.g., two, three, or more lenses), which may be arranged in series.

As briefly described above, thermal imaging camera 100 includes a focus mechanism for adjusting the focus of an infrared image captured by the camera. In the example shown in FIGS. 1 and 2, thermal imaging camera 100 includes focus ring 114. Focus ring 114 is operatively coupled (e.g., mechanically and/or electrically coupled) to at least one lens of infrared lens assembly 104 and configured to move the at least one lens to various focus positions so as to focus the infrared image captured by thermal imaging camera 100. Focus ring 114 may be manually rotated about at least a portion of housing 102 so as to move the at least one lens to which the focus ring is operatively coupled. In some examples, focus ring 114 is also operatively coupled to display 108 such that rotation of focus ring 114 causes at least a portion of a visible light image and at least a portion of an infrared image concurrently displayed on display 108 to move relative to one another. In different examples, thermal imaging camera 100 may include a manual focus adjustment mechanism that is implemented in a configuration other than focus ring 114, or may, in other embodiments, simply maintain a fixed focus.

In some examples, thermal imaging camera 100 may include an automatically adjusting focus mechanism in addition to or in lieu of a manually adjusting focus mechanism. An automatically adjusting focus mechanism may be operatively coupled to at least one lens of infrared lens assembly 104 and configured to automatically move the at least one lens to various focus positions, e.g., in response to instructions from thermal imaging camera 100. In one application of such an example, thermal imaging camera 100 may use laser 110 to electronically measure a distance between an object in a target scene and the camera, referred to as the distance-to-target. Thermal imaging camera 100 may then control the automatically adjusting focus mechanism to move the at least one lens of infrared lens assembly 104 to a focus position that corresponds to the distance-to-target data determined by thermal imaging camera 100. The focus position may correspond to the distance-to-target data in that the focus position may be configured to place the object in the target scene at the determined distance in focus. In some examples, the focus position set by the automatically adjusting focus mechanism may be manually overridden by an operator, e.g., by rotating focus ring 114.

During operation of thermal imaging camera 100, an operator may wish to view a thermal image of a scene and/or a visible light image of the same scene generated by the camera. For this reason, thermal imaging camera 100 may include a display. In the examples of FIGS. 1 and 2, thermal imaging camera 100 includes display 108, which is located on the back of housing 102 opposite infrared lens assembly 104 and visible light lens assembly 106. Display 108 may be configured to display a visible light image, an infrared image, and/or a combined image that includes a simultaneous display of the visible light image and the infrared image. In different examples, display 108 may be remote (e.g., separate) from infrared lens assembly 104 and visible light lens assembly 106 of thermal imaging camera 100, or display 108 may be in a different spatial arrangement relative to infrared lens assembly 104 and/or visible light lens assembly 106. Therefore, although display 108 is shown behind infrared lens assembly 104 and visible light lens assembly 106 in FIG. 2, other locations for display 108 are possible.

Thermal imaging camera 100 can include a variety of user input media for controlling the operation of the camera and adjusting different settings of the camera. Example control functions may include adjusting the focus of the infrared and/or visible light optics, opening/closing a shutter, capturing an infrared and/or visible light image, or the like. In the example of FIGS. 1 and 2, thermal imaging camera 100 includes a depressible trigger control 112 for capturing an infrared and visible light image, and buttons 116, which form part of the user interface, for controlling other aspects of the operation of the camera. A different number or arrangement of user input media are possible, and it should be appreciated that the disclosure is not limited in this respect. For example, thermal imaging camera 100 may include a touch screen display 108 which receives user input by depressing different portions of the screen.

Figure 3:
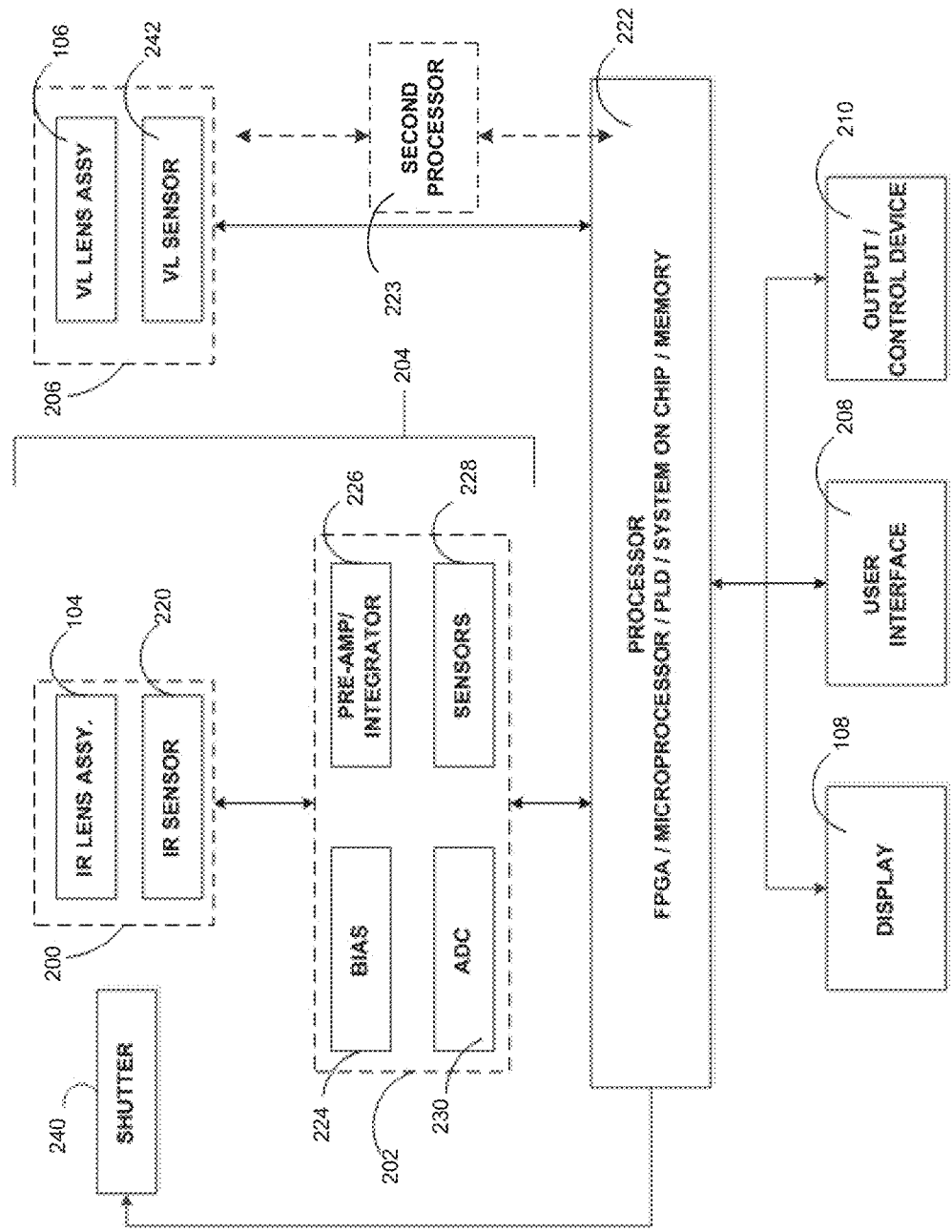
FIG. 3 is a functional block diagram illustrating example components of the thermal imaging camera of FIGS. 1 and 2.

FIG. 3 is a functional block diagram illustrating components of an example of thermal imaging camera 100. Thermal imaging camera 100 includes an IR camera module 200, front end circuitry 202. The IR camera module 200 and front end circuitry 202 are sometimes referred to in combination as front end stage or front end components 204 of the infrared camera 100. Thermal imaging camera 100 may also include a visible light camera module 206, a display 108, a user interface 208, and an output/control device 210.

Infrared camera module 200 may be configured to receive infrared energy emitted by a target scene and to focus the infrared energy on an infrared sensor for generation of infrared energy data, e.g., that can be displayed in the form of an infrared image on display 108 and/or stored in memory. Infrared camera module 200 can include any suitable components for performing the functions attributed to the module herein. In the example of FIG. 3, infrared camera module 200 is illustrated as including infrared lens assembly 104 and infrared sensor 220. As described above with respect to FIGS. 1 and 2, infrared lens assembly 104 includes at least one lens that takes infrared energy emitted by a target scene and focuses the infrared energy on infrared sensor 220. Infrared sensor 220 responds to the focused infrared energy by generating an electrical signal that can be converted and displayed as an infrared image on display 108.

Infrared sensor 220 may include one or more focal plane arrays (FPA) that generate electrical signals in response to infrared energy received through infrared lens assembly 104. Each FPA can include a plurality of infrared sensor elements including, e.g., bolometers, photon detectors, or other suitable infrared sensor elements. In operation, each sensor element, which may each be referred to as a sensor pixel, may change an electrical characteristic (e.g., voltage or resistance) in response to absorbing infrared energy received from a target scene. In turn, the change in electrical characteristic can provide an electrical signal that can be received by a processor 222 and processed into an infrared image displayed on display 108.

For instance, in examples in which infrared sensor 220 includes a plurality of bolometers, each bolometer may absorb infrared energy focused through infrared lens assembly 104 and increase in temperature in response to the absorbed energy. The electrical resistance of each bolometer may change as the temperature of the bolometer changes. With each detector element functioning as a sensor pixel, a two-dimensional image or picture representation of the infrared radiation can be further generated by translating the changes in resistance of each detector element into a time-multiplexed electrical signal that can be processed for visualization on a display or storage in memory (e.g., of a computer). Processor 222 may measure the change in resistance of each bolometer by applying a current (or voltage) to each bolometer and measure the resulting voltage (or current) across the bolometer. Based on these data, processor 222 can determine the amount of infrared energy emitted by different portions of a target scene and control display 108 to display a thermal image of the target scene.

Independent of the specific type of infrared sensor elements included in the FPA of infrared sensor 220, the FPA array can define any suitable size and shape. In some examples, infrared sensor 220 includes a plurality of infrared sensor elements arranged in a grid pattern such as, e.g., an array of sensor elements arranged in vertical columns and horizontal rows. In various examples, infrared sensor 220 may include an array of vertical columns by horizontal rows of, e.g., 16×16, 50×50, 160×120, 120×160, or 650×480. In other examples, infrared sensor 220 may include a smaller number of vertical columns and horizontal rows (e.g., 1–1), a larger number vertical columns and horizontal rows (e.g., 1000×1000), or a different ratio of columns to rows.

In certain embodiments a Read Out Integrated Circuit (ROIC) is incorporated on the IR sensor 220. The ROIC is used to output signals corresponding to each of the sensor pixels. Such ROIC is commonly fabricated as an integrated circuit on a silicon substrate. The plurality of detector elements may be fabricated on top of the ROIC, wherein their combination provides for the IR sensor 220. In some embodiments, the ROIC can include components discussed elsewhere in this disclosure (e.g. an analog-to-digital converter (ADC)) incorporated directly onto the FPA circuitry.

Such integration of the ROIC, or other further levels of integration not explicitly discussed, should be considered within the scope of this disclosure.

As described above, the IR sensor 220 generates a series of electrical signals corresponding to the infrared radiation received by each infrared detector element to represent a thermal image. A "frame" of thermal image data is generated when the voltage signal from each infrared detector element is obtained by scanning all of the rows that make up the IR sensor 220. Again, in certain embodiments involving bolometers as the infrared detector elements, such scanning is done by switching a corresponding detector element into the system circuit and applying a bias voltage across such switched-in element. Successive frames of thermal image data are generated by repeatedly scanning the rows of the IR sensor 220, with such frames being produced at a rate sufficient to generate a video representation (e.g. 30 Hz, or 60 Hz) of the thermal image data.

The front end circuitry 202 includes circuitry for interfacing with and controlling the IR camera module 200. In addition, the front end circuitry 202 initially processes and transmits collected infrared image data to a processor 222 via a connection therebetween. More specifically, the signals generated by the IR sensor 220 are initially conditioned by the front end circuitry 202 of the thermal imaging camera 100. In certain embodiments, as shown, the front end circuitry 202 includes a bias generator 224 and a pre-amp/integrator 226. In addition to providing the detector bias, the bias generator 224 can optionally add or subtract an average bias current from the total current generated for each switched-in detector element. The average bias current can be changed in order (i) to compensate for deviations to the entire array of resistances of the detector elements resulting from changes in ambient temperatures inside the thermal imaging camera 100 and (ii) to compensate for array-to-array variations in the average detector elements of the IR sensor 220. Such bias compensation can be automatically controlled by the thermal imaging camera 100 or software, or can be user controlled via input to the output/control device 210 or processor 222. Following provision of the detector bias and optional subtraction or addition of the average bias current, the signals can be passed through a pre-amp/integrator 226. Typically, the pre-amp/integrator 226 is used to condition incoming signals, e.g., prior to their digitization. As a result, the incoming signals can be adjusted to a form that enables more effective interpretation of the signals, and in turn, can lead to more effective resolution of the created image. Subsequently, the conditioned signals are sent downstream into the processor 222 of the thermal imaging camera 100.

In some embodiments, the front end circuitry 202 can include one or more additional elements for example, additional sensors 228 or an ADC 230. Additional sensors 228 can include, for example, temperature sensors, visual light sensors (such as a CCD), pressure sensors, magnetic sensors, etc. Such sensors can provide additional calibration and detection information to enhance the functionality of the thermal imaging camera 100. For example, temperature sensors can provide an ambient temperature reading near the IR sensor 220 to assist in radiometry calculations. A magnetic sensor, such as a Hall Effect sensor, can be used in combination with a magnet mounted on the lens to provide lens focus position information. Such information can be useful for calculating distances, or determining a parallax offset for use with visual light scene data gathered from a visual light sensor.

An ADC 230 can provide the same function and operate in substantially the same manner as discussed below, however its inclusion in the front end circuitry 202 may provide certain benefits, for example, digitization of scene and other sensor information prior to transmittal to the processor 222 via the connection therebetween. In some embodiments, the ADC 230 can be integrated into the ROIC, as discussed above, thereby eliminating the need for a separately mounted and installed ADC 230.

In some embodiments, front end components can further include a shutter 240. A shutter 240 can be externally or internally located relative to the lens and operate to open or close the view provided by the IR lens assembly 104. As is known in the art, the shutter 240 can be mechanically positionable, or can be actuated by an electro-mechanical device such as a DC motor or solenoid. Embodiments of the invention may include a calibration or setup software implemented method or setting which utilize the shutter 240 to establish appropriate bias levels for each detector element.

Components described as processors within thermal imaging camera 100, including processor 222, may be implemented as one or more processors, such as one or more microprocessors, digital signal processors (DSPs), application specific integrated circuits (ASICs), field programmable gate arrays (FPGAs), programmable logic circuitry, or the like, either alone or in any suitable combination. Processor 222 may also include memory that stores program instructions and related data that, when executed by processor 222, cause thermal imaging camera 100 and processor 222 to perform the functions attributed to them in this disclosure. Memory may include any fixed or removable magnetic, optical, or electrical media, such as RAM, ROM, CD-ROM, hard or floppy magnetic disks, EEPROM, or the like. Memory may also include a removable memory portion that may be used to provide memory updates or increases in memory capacities. A removable memory may also allow image data to be easily transferred to another computing device, or to be removed before thermal imaging camera 100 is used in another application. Processor 222 may also be implemented as a System on Chip that integrates all components of a computer or other electronic system into a single chip. These elements manipulate the conditioned scene image data delivered from the front end stages 204 in order to provide output scene data that can be displayed or stored for use by the user. Subsequently, the processor 222 (processing circuitry) sends the processed data to a display 108 or other output/control device 210.

During operation of thermal imaging camera 100, processor 222 can control infrared camera module 200 to generate infrared image data for creating an infrared image. Processor 222 can generate a digital "frame" of infrared image data. By generating a frame of infrared image data, processor 222 captures an infrared image of a target scene at a given point in time.

Processor 222 can capture a single infrared image or "snap shot" of a target scene by measuring the electrical signal of each infrared sensor element included in the FPA of infrared sensor 220 a single time. Alternatively, processor 222 can capture a plurality of infrared images of a target scene by repeatedly measuring the electrical signal of each infrared sensor element included in the FPA of infrared sensor 220. In examples in which processor 222 repeatedly measures the electrical signal of each infrared sensor element included in the FPA of infrared sensor 220, processor 222 may generate a dynamic thermal image (e.g., a video representation) of a target scene. For example, processor 222 may measure the electrical signal of each infrared sensor element included in the FPA at a rate sufficient to generate a video representation of thermal image data such as, e.g., 30 Hz or 60 Hz. Processor 222 may perform other operations in capturing an infrared image such as sequentially actuating a shutter 240 to open and close an aperture of infrared lens assembly 104, or the like.

With each sensor element of infrared sensor 220 functioning as a sensor pixel, processor 222 can generate a two-dimensional image or picture representation of the infrared radiation from a target scene by translating changes in an electrical characteristic (e.g., resistance) of each sensor element into a time-multiplexed electrical signal that can be processed, e.g., for visualization on display 108 and/or storage in memory. When displayed on a display 108, an infrared image can comprise a plurality of display pixels. Display pixels can have any defined relationship with corresponding sensor pixels. In some examples, each sensor pixel corresponds to a display pixel in an image representation of infrared data. In other examples, a plurality of sensor pixels may be combined (e.g., averaged) to provide infrared information for a single display pixel. Because relationships between display pixels and sensor pixels are defined with respect to camera operation, the generic term "pixel" may refer to the sensor pixel, the display pixel, or the data as it is processed from the sensor pixel to the display pixel unless otherwise stated. Processor 222 may perform computations to convert raw infrared image data into scene temperatures (radiometry) including, in some examples, colors corresponding to the scene temperatures.

Processor 222 may control display 108 to display at least a portion of an infrared image of a captured target scene. In some examples, processor 222 controls display 108 so that the electrical response of each sensor element of infrared sensor 220 is associated with a single pixel on display 108. In other examples, processor 222 may increase or decrease the resolution of an infrared image so that there are more or fewer pixels displayed on display 108 than there are sensor elements in infrared sensor 220. Processor 222 may control display 108 to display an entire infrared image (e.g., all portions of a target scene captured by thermal imaging camera 100) or less than an entire infrared image (e.g., a lesser port of the entire target scene captured by thermal imaging camera 100). Processor 222 may perform other image processing functions, as described in greater detail below.

Independent of the specific circuitry, thermal imaging camera 100 may be configured to manipulate data representative of a target scene so as to provide an output that can be displayed, stored, transmitted, or otherwise utilized by a user.

Thermal imaging camera 100 includes visible light camera module 206. Visible light camera module 206 may be configured to receive visible light energy from a target scene and to focus the visible light energy on a visible light sensor for generation of visible light energy data, e.g., that can be displayed in the form of a visible light image on display 108 and/or stored in memory. Visible light camera module 206 can include any suitable components for performing the functions attributed to the module herein. In the example of FIG. 3, visible light camera module 206 is illustrated as including visible light lens assembly 106 and visible light sensor 242. As described above with respect to FIGS. 1 and 2, visible light lens assembly 106 includes at least one lens that takes visible light energy emitted by a target scene and focuses the visible light energy on visible light sensor 242. Visible light sensor 242 responds to the focused energy by generating an electrical signal that can be converted and displayed as a visible light image on display 108.

Visible light sensor 242 may include a plurality of visible light sensor elements such as, e.g., CMOS detectors, CCD detectors, PIN diodes, avalanche photo diodes, or the like. The number of visible light sensor elements may be the same as or different than the number of infrared light sensor elements.

In operation, optical energy received from a target scene may pass through visible light lens assembly 106 and be focused on visible light sensor 242. When the optical energy impinges upon the visible light sensor elements of visible light sensor 242, photons within the photodetectors may be released and converted into a detection current. Processor 222 can process this detection current to form a visible light image of the target scene.

During use of thermal imaging camera 100, processor 222 can control visible light camera module 206 to generate visible light data from a captured target scene for creating a visible light image. The visible light data may include luminosity data indicative of the color(s) associated with different portions of the captured target scene and/or the magnitude of light associated with different portions of the captured target scene. Processor 222 can generate a "frame" of visible light image data by measuring the response of each visible light sensor element of thermal imaging camera 100 a single time. By generating a frame of visible light data, processor 222 captures visible light image of a target scene at a given point in time. Processor 222 may also repeatedly measure the response of each visible light sensor element of thermal imaging camera 100 so as to generate a dynamic thermal image (e.g., a video representation) of a target scene, as described above with respect to infrared camera module 200.

With each sensor element of visible light camera module 206 functioning as a sensor pixel, processor 222 can generate a two-dimensional image or picture representation of the visible light from a target scene by translating an electrical response of each sensor element into a time-multiplexed electrical signal that can be processed, e.g., for visualization on display 108 and/or storage in memory.

Processor 222 may control display 108 to display at least a portion of a visible light image of a captured target scene. In some examples, processor 222 controls display 108 so that the electrical response of each sensor element of visible light camera module 206 is associated with a single pixel on display 108. In other examples, processor 222 may increase or decrease the resolution of a visible light image so that there are more or fewer pixels displayed on display 108 than there are sensor elements in visible light camera module 206. Processor 222 may control display 108 to display an entire visible light image (e.g., all portions of a target scene captured by thermal imaging camera 100) or less than an entire visible light image (e.g., a lesser port of the entire target scene captured by thermal imaging camera 100).

In these and other examples, processor 222 may control display 108 to concurrently display at least a portion of the visible light image captured by thermal imaging camera 100 and at least a portion of the infrared image captured by thermal imaging camera 100. Such a concurrent display may be useful in that an operator may reference the features displayed in the visible light image to help understand the features concurrently displayed in the infrared image, as the operator may more easily recognize and distinguish different real-world features in the visible light image than the infrared image. In various examples, processor 222 may control display 108 to display the visible light image and the infrared image in side-by-side arrangement, in a picture-in-picture arrangement, where one of the images surrounds the other of the images, or any other suitable arrangement where the visible light and the infrared image are concurrently displayed.

For example, processor 222 may control display 108 to display the visible light image and the infrared image in a combined arrangement. In such an arrangement, for a pixel or set of pixels in the visible light image representative of a portion of the target scene, there exists a corresponding pixel or set of pixels in the infrared image, representative of substantially the same portion of the target scene. Similarly, images having corresponding pixels (i.e., pixels representative of the same portion of the target scene) can be referred to as corresponding images. Thus, in some such arrangements, the corresponding visible light image and the infrared image may be superimposed on top of one another, at corresponding pixels. An operator may interact with user interface 208 to control the transparency or opaqueness of one or both of the images displayed on display 108. For example, the operator may interact with user interface 208 to adjust the infrared image between being completely transparent and completely opaque and also adjust the visible light image between being completely transparent and completely opaque. Such an exemplary combined arrangement, which may be referred to as an alpha-blended arrangement, may allow an operator to adjust display 108 to display an infrared-only image, a visible light-only image, of any overlapping combination of the two images between the extremes of an infrared-only image and a visible light-only image. Processor 222 may also combine scene information with other data, such as radiometric data, alarm data, and the like. In general, an alpha-blended combination of visible light and infrared images can comprise anywhere from 100 percent infrared and 0 percent visible light to 0 percent infrared and 100 percent visible light. In some embodiments, the amount of blending can be adjusted by a user of the camera. Thus, in some embodiments, a blended image can be adjusted between 100 percent visible light and 100 percent infrared.

Additionally, in some embodiments, the processor 222 can interpret and execute commands from user interface 208, an output/control device 210. This can involve processing of various input signals and transferring those signals to the front end circuitry 202 via a connection therebetween. Components (e.g. motors, or solenoids) proximate the front end circuitry 202 can be actuated to accomplish the desired control function. Exemplary control functions can include adjusting the focus, opening/closing a shutter, triggering sensor readings, adjusting bias values, etc. Moreover, input signals may be used to alter the processing of the image data that occurs in the processor 222.

Processor can further include other components to assist with the processing and control of the infrared imaging camera 100. For example, as discussed above, in some embodiments, an ADC can be incorporated into the processor 222. In such a case, analog signals conditioned by the front-end stages 204 are not digitized until reaching the processor 222. Moreover, some embodiments can include additional on board memory for storage of processing command information and scene data, prior to transmission to the display 108 or the output/control device 210.

An operator may interact with thermal imaging camera 100 via user interface 208, which may include buttons, keys, or another mechanism for receiving input from a user. The operator may receive output from thermal imaging camera 100 via display 108. Display 108 may be configured to display an infrared-image and/or a visible light image in any acceptable palette, or color scheme, and the palette may vary, e.g., in response to user control. In some examples, display 108 is configured to display an infrared image in a monochromatic palette such as grayscale or amber. In other examples, display 108 is configured to display an infrared image in a color palette such as, e.g., ironbow, blue-red, or other high contrast color scheme. Combinations of grayscale and color palette displays are also contemplated.

While processor 222 can control display 108 to concurrently display at least a portion of an infrared image and at least a portion of a visible light image in any suitable arrangement, a picture-in-picture arrangement may help an operator to easily focus and/or interpret a thermal image by displaying a corresponding visible image of the same scene in adjacent alignment.

A power supply (not shown) delivers operating power to the various components of thermal imaging camera 100 and, in some examples, may include a rechargeable or non-rechargeable battery and a power generation circuit.

During operation of thermal imaging camera 100, processor 222 controls infrared camera module 200 and visible light camera module 206 with the aid of instructions associated with program information that is stored in memory to generate a visible light image and an infrared image of a target scene. Processor 222 further controls display 108 to display the visible light image and/or the infrared image generated by thermal imaging camera 100.

As noted, in some situations, it can be difficult to differentiate between real-world features of the target scene in a thermal image. In addition to supplementing the infrared image with visible light information, in some embodiments, it can be useful to emphasize physical edges within the target scene. While edge detection can be difficult to perform in an infrared image, known edge detection methods can be performed on a corresponding visible light image of the same target scene. Because of the corresponding relationship between the infrared image and the visible light image, visible light pixels determined to represent a physical edge in the target scene correspond to infrared pixels also representing the edge in the infrared image.

Exemplary edge detection methods can include Canny edge detection, Kirsch operators, the Sobel operator, the Prewitt operator and the Roberts cross operator. An alternative method is generally described in the paper "Focused edge detection using color histogram" by Kashiwagi, (hereinafter "Kashiwagi"), which is incorporated herein by reference. In such a process, the pixels in a visible light image are broken down into a 3-dimensional color histogram, wherein the number of pixels corresponding to each particular color making up the visible light image is analyzed. Colors can be defined and distinguished in any of a variety of color spaces, such as RGB, YCbCr, or CMYK, and placed into bins corresponding to the number of occurring pixels comprising specific colors. Utilizing this analysis, the least populated bins (that is, the least frequently occurring colors) are deemed to be representative of an edge within the image. Thus, if a pixel is in one of the least populated bins, the pixel is determined to be an edge pixel, that is, a pixel representative of an edge.

It should be noted that various edge detection processes can detect boundaries present in a visible light image that may or may not represent true physical extent of an object in the target scene. Accordingly, as used herein, edges are used generally to describe any detectable boundary in the visible light image that may not correspond exclusively to a physical extent of an object.

In some embodiments, edge pixels can be defined by a threshold applied to bins or the pixels themselves. For example, pixels in a certain number of the least populated bins (e.g., 5 least populated bins) or pixels in the lowest percentile of populated bins (e.g., bottom 5% of bin population) can be deemed to be edge pixels. In other examples, each of the least populated bins is deemed to comprise edge pixels until the number or percentage of edge pixels crosses a certain threshold. In some such embodiments, a user can define the threshold in order to determine the edge detection sensitivity. In further embodiments, the detected edge can be indicated to the user in real time, allowing the user to dynamically adjust the edge detection sensitivity while simultaneously observing the effect. In some embodiments, the edge detection method is employed by the processor 222 while presenting the detected edge to the user via display 108. The user can then adjust the edge detection sensitivity via the user interface 208 while observing the effect real-time on the display.

In an alternative edge detection process, each pixel can be analyzed without sampling the entire RGB composition of a visible light image. For example, in some embodiments, an M by N pixel kernel is defined and analyzed, wherein M and N are any positive integers. In further embodiments, a square N by N pixel kernel is analyzed, and in still further embodiments N is an odd integer and the target pixel is in the center of the N by N square. In such embodiments, edges can be detected in a two-step process. First, the variance of a particular kernel including a target pixel is analyzed. If the variance exceeds a certain threshold, the target pixel is compared to mean pixel value within the kernel. If the target pixel is a certain threshold above the mean of the kernel, the target pixel is deemed an edge pixel. In some embodiments, the compared values of pixels can comprise luminance values detected in each pixel.

In this exemplary edge detection process, multiple thresholds exist for user manipulation. In addition, each pixel need only be targeted and analyzed once, and no subsequent processing or iteration need be performed. As such, this process can potentially perform edge detection faster with respect to a captured frame. Faster edge detection can facilitate real-time edge detection in portable cameras, such as a hand-held thermal imaging camera. In some embodiments, thermal imaging camera can detect edges and indicate edge information to the user in real time. In some examples, real time edge detection and indication can be performed at a variety of frame rates, such as 30 or 60 frames per second. Generally, any value can be used. In some embodiments, the frame rate can be selectable by a user.

Various edge detection methods have been described. In general, with respect to visible light and infrared images, visible light images provide more distinct edge features detectable by such methods. However, as described, in some embodiments, a thermal imaging camera can acquire an infrared and a corresponding visible light image of a target scene, in which pixels of the infrared image correspond to pixels of the visible light image and are representative of substantially the same portion of the target scene. Thus, an edge detected in a visible light image can be used to detect a corresponding edge in an infrared image despite a possible lack of thermal differentiation across the edge.

It should be noted that in some embodiments, the pixel count and/or density of a visible light and a corresponding infrared image need not be the same. In some embodiments, for example, there can be more visible light pixels in a single visible light frame than there are infrared pixels in the corresponding infrared frame, or vice versa. Thus, corresponding pixels need not have a direct one-to-one relationship. Rather, in some embodiments, a single infrared pixel has a plurality of corresponding visible light pixels, or a visible light pixel has a plurality of corresponding infrared pixels. Additionally or alternatively, in some embodiments, not all visible light pixels have corresponding infrared pixels, or vice versa. Such embodiments may be indicative of, for example, a picture-in-picture type display as previously discussed. Thus, a visible light pixel will not necessarily have the same pixel coordinate within the visible light image as does a corresponding infrared pixel. Accordingly, as used herein, corresponding pixels generally refers pixels from any image (e.g., a visible light image, an infrared image, a combined image, a display image, etc.) comprising information from substantially the same portion of the target scene. Such pixels need not have a one-to-one relationship between images and need not have similar coordinate positions within their respective images.

Figure 4:
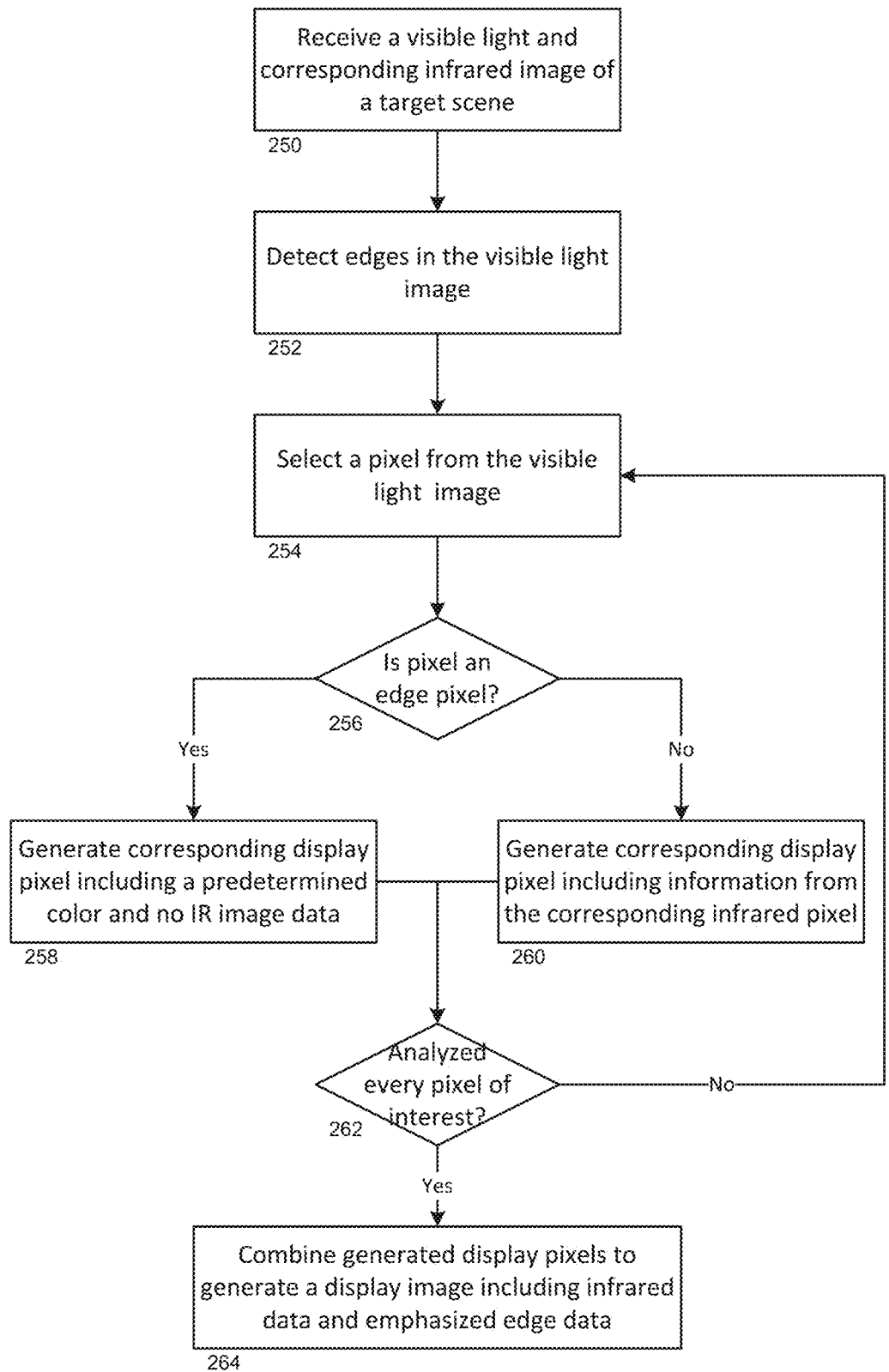
FIG. 4 is a process-flow diagram illustrating a general method for incorporating detected edge information into a display image including infrared data.

Once pixels representing edges in the target scene have been detected, there are several ways in which the edge data can be incorporated into a displayed image in order to assist a user in interpreting a thermal image. FIG. 4 is a process-flow diagram illustrating a general method for incorporating detected edge information into a display image including infrared data. The process can be performed, for example, by a processor. In general, a processor can receive 250 a visible light image and a corresponding infrared image of a target scene. Receiving 250 images can include, for example, capturing the images with a thermal imaging camera, receiving image data representative of a thermal scene directly from imaging arrays, or uploading existing images from memory storage. The processor can detect edges 252 in the visible light image by analyzing the visible light image data and using any appropriate method. Considerations such as the power and intended function of the processor (i.e., real-time video representation of a target scene, post-capture processing of images, etc.) may account for the edge detection method to be used. In general, VL pixels corresponding to detected edges in the VL image data can be considered VL edge pixels. In some examples, VL pixels not corresponding to detected edges in the VL image data can be considered VL non-edge pixels, though such pixels need not always be specified as such. In some embodiments, the set of pixels that are detected as edge pixels can define a first set of pixels in the visible light image. Similarly, corresponding pixels in the infrared image can define a first set of pixels in the infrared image, and corresponding pixels in the display image can define a first set of pixels in the display image.

The processor can then select 254 a pixel from the visible light image and determine 256 if the pixel is an edge pixel and generate a corresponding display pixel accordingly. A corresponding display pixel is a pixel to be used in a resultant image that can be intended for display. It is a corresponding pixel in that it comprises information from substantially the same portion of the target scene as the selected visible light pixel and its corresponding infrared pixel. In some embodiments, if the selected pixel is an edge pixel, the processor can generate 258 a corresponding display pixel including a predetermined color. That is, for display pixels corresponding to VL edge pixels, the processor can assign display image data to each such display pixel of the predetermined color to emphasize the location of edges in the display image data. The predetermined color can be a color selected, for example, by a user from a list or a color palette. It should be noted that assigning display image data of the predetermined color can include the color exclusively, or can comprise some blended or otherwise modified version of the predetermined color.

If the selected pixel is not an edge pixel, the processor can generate 260 a corresponding display pixel including information from the corresponding infrared pixel. The display pixel including information from the corresponding infrared pixel can include data from the infrared pixel exclusively, or could comprise a blend of the corresponding infrared and visible light pixels. That is, for display pixels corresponding to VL pixels that are the VL non-edge pixels, the processor can assign display image data to each such display pixel as a blend of the IR image data and the VL image data of the associated IR pixel and VL pixel corresponding to such display pixel. It should be noted that the blend of the IR and VL image data can range from 100 percent IR image data and 0 percent VL image data to 0 percent IR image data and 100 percent VL image data. That is, the blend of the IR image data and the VL image data can comprise, for example, entire IR image data and no VL image data.

In general, a plurality of such display pixels can be generated in order to generate a display image associated with such pixels. In various embodiments, some of the display pixels include IR image data associated with corresponding IR pixels. Display pixels corresponding to VL edge pixels can include a predetermined color. In some embodiments, such display pixels do not include any IR image data associated with corresponding IR pixels. Accordingly, in some configurations, display pixels not corresponding to VL edge pixels can include IR image data associated with corresponding IR pixels, while display pixels corresponding to VL edge pixels do not include such corresponding IR image data.

In some embodiments, the processor can determine 262 if every pixel of interest has been analyzed. That is, the processor can determine if every pixel for which edge detection is desired has been analyzed. If not, the processor selects 254 another visible light pixel and the analysis repeats. If, however, each pixel of interest has been analyzed, the set of generated display pixels can be combined to generate a display image including infrared data and emphasized edge data at pixels corresponding to non-edge and edge pixels in the visible light image, respectively. In some embodiments, the processor does not necessarily perform the method in a pixel-by-pixel manner as illustrated. For example, once edge pixels are detected 252, each edge pixel can be used to generate edge display pixels in the display image while each non-edge pixel can be used to generate non-edge display pixels in the display image simultaneously without requiring an iterative process as illustrated by the feedback arrow from 262. In some such embodiments, the processor need not explicitly check that each pixel of interest has been analyzed. In addition, it should be noted that steps in the process-flow diagram of FIG. 4 may be permuted. For example, in some embodiments, the processor can analyze a single pixel in the visible light image, determine if that pixel is an edge pixel, and proceed to generate the corresponding display pixel prior to analyzing any subsequent pixels in the visible light image.

Various embodiments of the process illustrated in FIG. 4 are as follows:

Example 1: If a pixel is detected as an edge pixel in the visible light image, the corresponding display pixel in the display image will be displayed as a predetermined color, which can be selected by a user. The display pixels that do not corresponding to an edge pixel in the visible light image can be populated with corresponding infrared pixels from the infrared image, or a blend of corresponding infrared and visible light pixels. In instances in which blending is performed, in some embodiments, edge pixels detected in the visible light image will be replaced with the predetermined color prior to blending. Subsequently, the visible light and infrared images are blended wherein any pixels in the visible light image having exclusively the predetermined color will be unaffected by blending and will be passed through the image blender and to the display image as the predetermined color.

Example 2: If a pixel is detected as an edge pixel in the visible light image, the corresponding pixel in the infrared image is replaced by a predetermined color to create a modified infrared image. Subsequently, the modified infrared image can be presented as the display image, or can be blended with the visible light image to create the display image. In some examples, blending can be performed such that the pixels corresponding to the detected VL edge pixels in the resulting display image include the predetermined color, though not necessarily exactly as included in the modified IR image due to the blending step. However, such display pixels can still be said to include the predetermined color.

In any such embodiment, the display image can be presented on a display including infrared information and having detected edge pixels including the predetermined color. As mentioned, in some embodiments, some of the display pixels include IR image data associated with corresponding IR pixels. In some such embodiments, however, display pixels corresponding to VL edge pixels include a predetermined color and do not include any IR image data associated with corresponding IR pixels.

In generating such a display image, IR image information can be generally presented across portions of the display image, while portions of the display image corresponding to detected edges can be emphasized with the predetermined color. In particular, in some such embodiments, the display pixels corresponding to VL edge pixels do not include any IR image data in order to more clearly distinguish such edge pixels from non-edge pixels that do include IR image data. Thus, the display image can include IR image data wherein detected edges are emphasized with a predetermined color, thereby providing better context of the target scene to a viewer of the infrared image data. In addition, in embodiments, the replacing of pixels with the predetermined color prior to the processing image data and/or not requiring the inclusion of IR image data in display pixels corresponding to VL edge pixels can reduce the number of processing steps and/or the processing power required for generating the display image. Accordingly, display images can be generated quickly and presented in substantially real time.

In various embodiments, the display image can comprise a blend of visible light and infrared pixels, with the amount of blending adjustable by a user. The display image can be presented in a picture-in-picture arrangement, wherein the display image is presented within a visible light image, for example. In some embodiments, a visible light image can be presented in color surrounding a blended display image. In further embodiments, a portion of the visible light image to be blended is converted into grayscale prior to blending with the corresponding portion of a palettized infrared image. The resulting blended portion of the display image can be presented within the remaining (unblended) visible light image, which can remain colored. That is, in some embodiments, only pixels to be blended with infrared pixels are converted to grayscale for blending, the remaining visible light pixels remain presented in color.

Such a picture-in-picture display can assist the user in differentiating between elements of the target scene. In various embodiments in which edges are detected and/or emphasized in a resulting display image, the edges are emphasized only within the blended portion of the display image (though the edge pixels themselves need not be blended). Alternatively, edge pixels in the display image can be presented throughout the entire display image, including outside of the blended portion thereof.

Each of the various embodiments herein described can be carried out by a processor or series of processors in, for example, a thermal imaging camera or an external device such as a PC. In addition, embodiments can be performed on corresponding visible light and infrared images stored in memory, or can be performed in situ on received visible light and infrared image data in order to execute the method and present resulting display images in substantially real time on a display. Employed methods can be selected, for example, based on desired functionality, available and required processing power/speed, or other reasons. In addition, methods can be carried out in any appropriate systems for processing and/or displaying image data, such as various mobile devices including smart phones and tablets.

With further reference to FIG. 3, in one exemplary embodiment, a thermal imaging camera comprises a processor 222 such as an FPGA for processing and blending visible light and infrared images as described above, and comprises a second processor 223 (e.g., a second FPGA) included in or otherwise in communication with the visible light module 206. The second processor 223 can receive and process visible light image data from the visible light module 206 and detect edge pixels in the visible light image. In some embodiments, the second processor 223 processes the visible light image data by detecting edge pixels and replacing the detected edge pixels with a predetermined color prior to passing the modified visible light image data to the processor 222. The predetermined color can be selected by a user via the user interface 208 and directed to the second processor 223 for visible light image data modification.

The processor 222 can receive modified visible light image data and proceed according to any of several methods to incorporate edge data into a display image. For example, the processor 222 can be configured to blend at least portions of the modified visible light data from the second processor 223 with corresponding portions of infrared image data from the infrared camera module 200 or front end circuitry 202 to create a display image. Blending can range from 0 to 100 percent visible light and 100 to 0 percent infrared, and can be determined by a user. In some embodiments, the blending process is such that if the processor 222 detects a pixel in the modified visible light image data having exclusively the predetermined color, that pixel is unaffected by the blending process and the corresponding pixel in the display image consists of only the predetermined color. Similarly, in some embodiments, prior to the blending, pixels in the display image corresponding to detected VL edge pixels can be assigned the predetermined color, and a blending process for generating such display pixels can be skipped entirely. In a similar embodiment, display pixels corresponding to VL edge pixels can be replaced by pixels of the predetermined color. Thus, in at least a portion of the display image, detected edges are emphasized to the user in the predetermined color. In some cases, a portion of the display image comprises infrared image data in the non-edge pixels and the predetermined color in the edge pixels.

Figure 5:
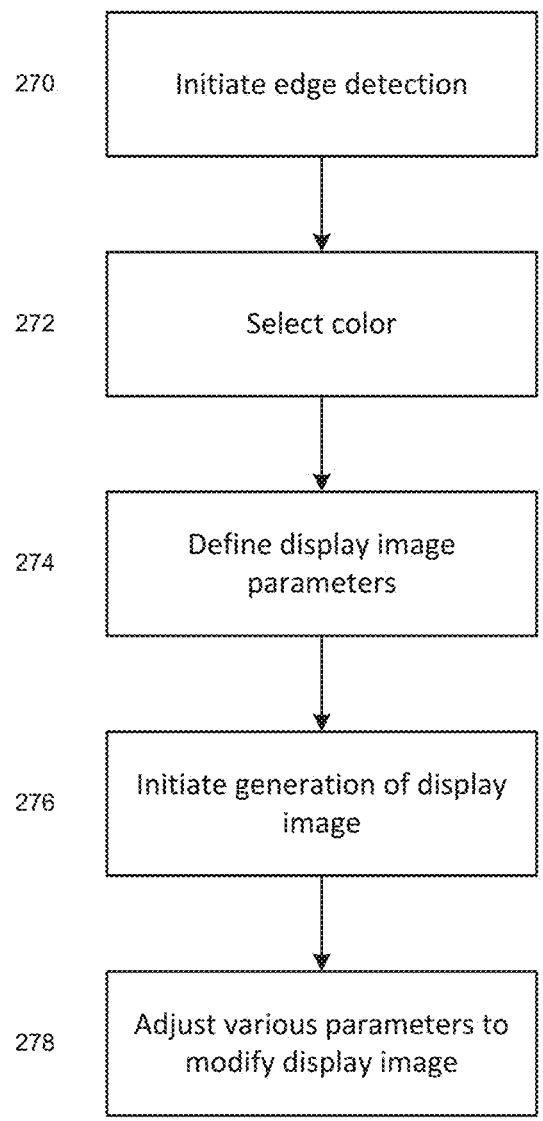
FIG. 5 is a process-flow diagram illustrating exemplary operation of generating and modifying a display image.

FIG. 5 is a process-flow diagram illustrating exemplary operation of generating and modifying a display image. In various embodiments, a user can initiate 270 edge detection in a visible light image having a corresponding infrared image. The user can be the user of a thermal imaging camera or other computing device either with or without the ability to acquire visible and/or infrared images. In various devices, the images can be acquired by the device or otherwise stored in the device in memory, for example. In initiating 270 edge detection, the device can perform any appropriate method for detecting edges in the visible light image.

The user can select 272 a color for use in emphasizing the detected edges in a display image. In some embodiments, the user can select the color from a predefined list of colors. In other embodiments, the user can select any color in RGB space by inputting individual R (red) G (green) and B (blue) values, or by selecting a color from a color palette. Similarly, among various embodiments, the user can define a color by inputting values into any known color space, such as YCbCr and CMYK, for example. The selected color can be defined as a predetermined color and used to display the location of detected edges in the display image either directly, or by blending the predetermined color with corresponding pixel data, in some examples from the visible light image.

Beyond selecting 272 the predetermined color for emphasizing detected edges in the display image, the user can define 274 display image parameters. Such parameters can include, for example, the desired color palette used to represent the infrared image data, the type of display image to be used (such as a picture-in-picture display, a blended image, or other known display types), and the amount of desired blending between the visible light and infrared images. In some embodiments, the user can also define the sensitivity of the edge detection. This can affect the thickness of the edges presented in the display image as well as the number of edges detected. In other embodiments, a default sensitivity is used.

The user can initiate 276 generation of the display image on the device in various ways. In some devices, the user selects a visible light image and a corresponding infrared image from which to produce a display image. Such might be the case in, for example, a PC. In other devices, such as a portable thermal imaging camera, the user may simply point the camera at a target scene and display images will be generated in real time. In other embodiments, the user can trigger image capture using the thermal imaging camera in order to acquire one or more frames of visible light and corresponding infrared images. Upon display image generation, the user can be presented with a display image comprising infrared image data from a target scene and emphasized edge data including the predetermined color.

As previously described, the display image pixels corresponding to the detected edges in the visible light image can, in some embodiments, consist exclusively of the predetermined color. In other embodiments, such pixels comprise the predetermined color blended with the visible light pixel, for example. In some configurations and with some devices, the nature of emphasizing the edge pixels can be selected by the user while defining 274 display image parameters. In other devices or particular modes of operation, only a particular method of emphasizing detected edges may be utilized. For example, during real time image acquisition, edge detection, and display image display, some methods of edge detection and/or display may require too much processing time to execute while providing a real-time display.

In some configurations, a user can adjust 278 various parameters to modify the display image. For example, in some embodiments, a user can adjust the type of visible light and infrared display (e.g., blend, picture-in-picture, etc.), the amount of blending in the blended portion of the image, the selected color or the edge detection sensitivity. Thus, a user can adjust parameters in order to change the presentation of the display image according to his or her preferences or correct potential misrepresentation of the image (e.g., too many or not enough edges are detected). In various embodiments, the user can capture, print, save, modify or monitor the display image in accordance with the task being performed by the user.

It will be appreciated that various steps in the process illustrated in FIG. 5 can be combined, permuted and/or omitted. For example, initiating 270 edge detection and initiating 276 generation of the display image can be included in the same step or performed simultaneously. A user can select 272 a color (for example from a predefined list of colors, an interactive color palette, or an input for a user to define values in any of a number of color spaces) to be the predetermined color, define 274 the display image parameters, and initiate 276 generation of the display image wherein the display image is already configured to comprise emphasized edge data including the predetermined color. In such a case, edge detection can be initiated 270 upon initiation 276 of the display image generation.

In addition, the process outlined from a user's perspective in FIG. 5 can be performed from the perspective of, for example, a processor, thermal imaging camera, stand-alone computer, or the like. Such a process could comprise receiving a command initiating edge detection, receiving a selected color, generating display image data and receiving commands for adjusting the display image data. Additional exemplary steps could include presenting display image data on a display, receiving VL image data and receiving IR image data. Receiving commands for adjusting at least one parameter can include commands for adjusting at least one of an edge detection threshold, the selected color, an image display type (e.g., picture-in-picture, overlap, etc.), and an amount of blending to incorporate between VL and IR image data. As noted, various steps in the process can be omitted and/or permuted among embodiments of the invention. For example, the processor can simply generate a display image according to various methods described herein without receiving input from the user. Such an example can be carried in the generation and presentation of a real-time display image including infrared image data and emphasized edges including a predetermined color.

Figure 6A:
FIGS. 6A-6F illustrate various display images of a target scene.
Figure 6B:
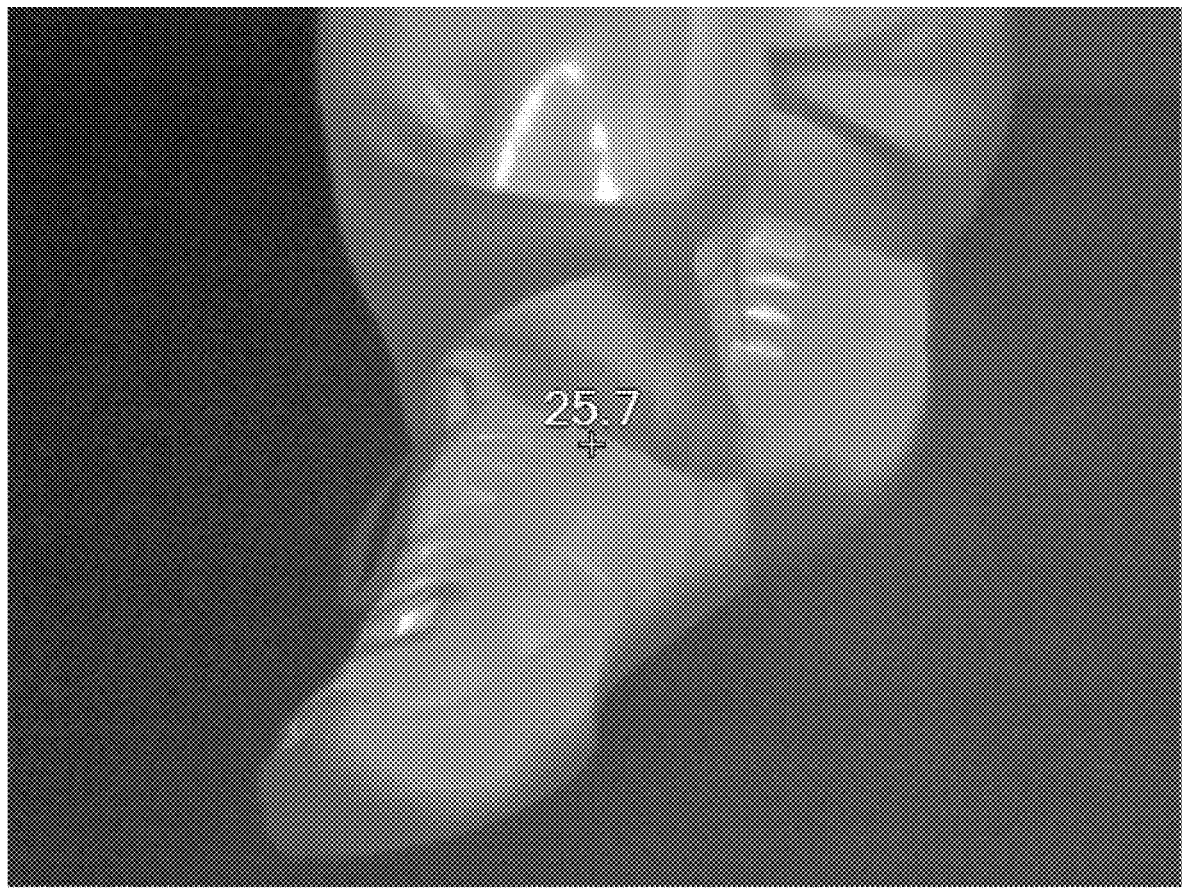
Figure 6C:

FIGS. 6A-6F illustrate various display images of a target scene. FIG. 6A is a display image comprising the visible light image data of the target scene. FIG. 6B is a display image comprising the infrared image data of the target scene. While objects of different temperatures are relatively distinguishable within the scene, some edges noticeable in the visible light image (particularly edges showing details of portions of the image such as stripes on the shoe) are obscured because of relatively uniform thermal radiation emitted from either side of the edge. Edges of the visible light image can be detected using any appropriate edge detection scheme such as those herein described. Moreover, in some embodiments, the sensitivity of a particular edge detection scheme can be adjusted by a user, resulting in more or fewer detected edges. FIG. 6C is an exemplary set of edge pixels detected in the visible light image of FIG. 6A using an edge detection scheme with a first sensitivity.

Figure 6D:

FIG. 6D is a display image in which edges have been detected using an edge detection process and a first sensitivity, as illustrated in FIG. 6C. As shown, edges from the infrared image of FIG. 6B are emphasized with the detected lines shown in FIG. 6C. Such lines provide context to a viewer viewing the display image. The display image of FIG. 6D can be presented as a blended image in which the visible light image data and corresponding infrared image data are blended to produce the image. As discussed, blending can range from 100 percent infrared and 0 percent visible light to 0 percent infrared and 100 percent visible light. The edge detection and display such as that shown in FIGS. 6C and 6D can be performed using any of the methods and/or embodiments herein described. For example, the display image of FIG. 6D can be presented on a display of a thermal imaging camera in real-time, continually updating as the camera is directed at different target scenes and/or the target scene changes. As discussed, in some examples, parameters of the display image are adjustable by a user, such as the sensitivity of the edge detection.

Figure 6E:

FIG. 6E is a display image similar to that of FIG. 6C, in which detected edges in the image of FIGS. 6A and 6B are presented. In FIG. 6E, the displayed edges are detected using a second edge sensitivity, resulting in a greater number of detected edge pixels when compared to the first edge sensitivity. For example, in the edge detection process used to detect the edge pixels of FIG. 6E, a detection threshold might be lower than for the edge detection process used to detect the edge pixels represented in FIG. 6C.

Figure 6F:
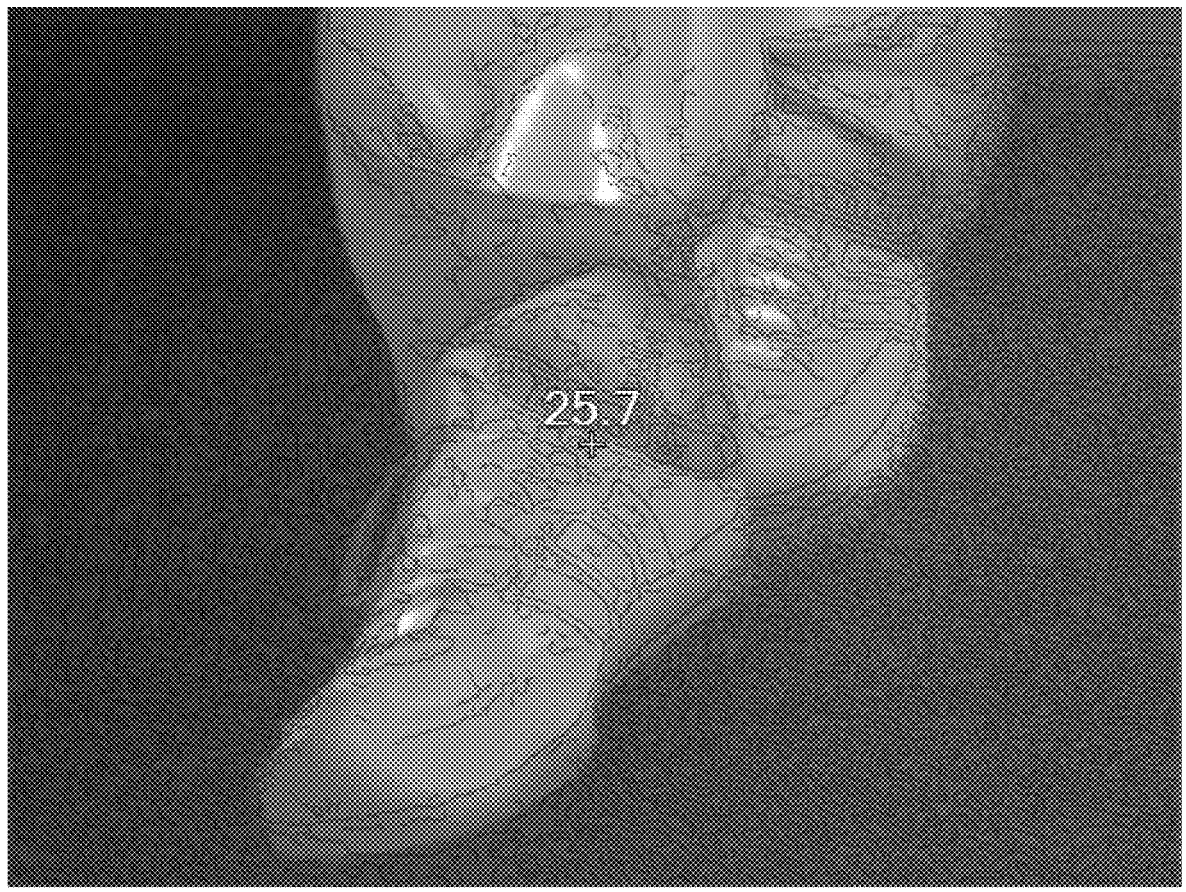

FIG. 6F is a display image such as that shown in FIG. 6B, including the emphasized edge pixels of FIG. 6E. In the display image of FIG. 6F, many more emphasized edge pixels are presented than in the same scene of FIG. 6D. In this particular example, the sensitivity of the edge detection process has been increased, thereby increasing the number of pixels in the visible light image considered to be visible light edge pixels and presented as such in the associated display image data. In some embodiments, the user can adjust the edge detection sensitivity in and observe changes in the detected edges of a captured image in real time. In further embodiments, the edge detection sensitivity can be adjusted while the display image is updated in real time, allowing the user to immediately observe the change in the detected edges while performing an imaging operation.

Example thermal image cameras and related techniques have been described. The techniques described in this disclosure may also be embodied or encoded in a computer-readable medium, such as a non-transitory computer-readable storage medium containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), a hard disk, optical media, or other computer readable media.

For example, an external computer comprising such computer readable medium can receive corresponding visible light and infrared images from a thermal imaging camera or from memory and perform edge detection and/or generate display images as described herein. In some embodiments, various portions of the techniques can be embodied in multiple components. For example, a thermal imaging camera can detect edges in a visible light image and pass detected edge information to an external computing device for generating the display image utilizing the detected images.

In further examples, embodiments of the invention can be embodied in a display system. The display system can be configured to receive VL and IR image data and carry out processes such as those herein described. Exemplary display systems can include one or more processors, a display and a user interface for carrying out such processes. A display system can be incorporated into any appropriate device or system capable of receiving and processing image data. In some embodiments, the display system can include a thermal imaging camera, such as a hand-held thermal imaging camera as described elsewhere herein in order to capture corresponding VL and IR images and provide VL and IR image data to other components of the imaging system. In further embodiments, the imaging system is fully incorporated into such a camera, or can consist essentially of a camera capable of carrying out any of the various processes described.

Various embodiments have been described. Such examples are non-limiting, and do not define or limit the scope of the invention in any way. Rather, these and other examples are within the scope of the following claims.

The invention claimed is:

1. A method for generating a display image from visible light image (VL) data and infrared (IR) image data comprising:
   receiving VL image data associated with a plurality of VL pixels indicative of a VL image of a target scene;
   receiving IR image data associated with a plurality of IR pixels indicative of an IR image of the target scene;
   determining which VL pixels correspond to edges in the VL image data and considering such pixels as VL edge pixels; and
   generating display image data including a plurality of portions, each of the plurality of portions of the display image data corresponding to a respective portion of the visible light image data and a respective portion of the infrared image data, wherein:
      the portions of the display image, corresponding to the portions of the visible light image data not corresponding to edges in the visible light image data, include infrared image data from the corresponding portions of the infrared image data; and
      the portions of the display image, corresponding to the portions of the visible light image data corresponding to edges in the visible light image data, include a predetermined color and exclude the infrared image data from the corresponding portions of the infrared image data.

2. The method of claim 1, further comprising receiving a selection of the predetermined color.

3. The method of claim 2, wherein receiving the selection of the predetermined color comprises:
   presenting an interface providing one or more selectable options corresponding to the predetermined color; and
   receiving the selection of the predetermined color via the interface.

4. The method of claim 2, wherein the infrared image data further comprises a color palette to represent the infrared image data; and the method further comprises:
   presenting an interface providing one or more selectable options corresponding to one or more color palettes; and
   receiving a selection of a color palette from the one or more color palettes via the interface.

5. The method of claim 4, wherein the predetermined color is automatically selected by selecting the color palette such that the selected predetermined color provides contrast to the selected color template.

6. The method of claim 1, wherein the portions of the visible light image comprise a plurality of pixels; wherein the portions of the visible light image data not corresponding to edges in the visible light image data comprise a plurality of pixels not corresponding to edges in the visible light image data; and
   the portions of the visible light image data corresponding to edges in the visible light image data comprise a plurality of pixels corresponding to edges in the visible light image data.

7. The method of claim 1, wherein the portions of the display image corresponding to edges in the visible light image data include only the predetermined color.

8. The method of claim 1, wherein the portions of the display image corresponding to edges in the visible light image data do not include any infrared image data.

9. The method of claim 1, wherein the portions of the display image corresponding to edges in the visible light image comprises combining the predetermined color with at least one of the visible light image data and the infrared image data.

10. The method of claim 1, wherein the predetermined color provides contrast to the thermal image data.

11. The method of claim 1, wherein the predetermined color is independent of the infrared image data.

12. A thermal imaging system for generating and displaying a display image comprising:
   a visible light (VL) camera module comprising a visible light lens assembly having an associated VL sensor for generating VL image data representative of a target scene;
   an infrared (IR) camera module comprising an IR lens assembly and an associated IR sensor for generating IR image data representative of at least a portion of the target scene; and
   a processor
   configured to
      receive the VL image data from the VL camera module and the IR image data from the IR camera module;
      detect, among a plurality of pixels in the VL image data, pixels representing edges in the VL image data, and
      generate a display image having a plurality of pixels, wherein
         the pixels of the display image not considered to be a VL edge pixel comprises IR image data;
         the pixels of the display image that are considered to be VL edge pixels comprise a predetermined color.

13. The system of claim 12, wherein the pixels of the display image that correspond to detected edges in the visible light image data comprise no infrared data.

14. The system of claim 13, wherein the pixels of the display image that correspond to detected edges in the visible light image data comprise only the predetermined color.

15. The system of claim 12, wherein the pixels of the display image that correspond to detected edges in the visible light image data comprise a blend of the predetermined color with at least one of the visible light image data and the infrared image data.

16. The camera of claim 12, further comprising a display in communication with the processor, and wherein the processor is further configured to present the display image on the display.

17. The camera of claim 16 wherein the processor is further configured to receive a color palette to represent the infrared image data as palletized infrared image data; and the pixels of the display image that do not correspond to edges in the visible light image include the palletized infrared image data.

18. The camera of claim 17, wherein the received color palette comprises a selection of the color palette from one or more selectable options.

19. The camera of claim 17, wherein the predetermined color is automatically selected by selecting the color palette.

20. The camera of claim 17, wherein the selected predetermined color provides contrast to the color palette.

21. The camera of claim 12, wherein the predetermined color is independent of the infrared image data.

* * * * *